United States Patent
Girardi et al.

(10) Patent No.: US 9,845,717 B2
(45) Date of Patent: Dec. 19, 2017

(54) SYSTEMS AND METHODS FOR MANAGING DIESEL EXHAUST FLUID STRATIFICATION

(71) Applicant: Ford Global Technologies, LLC, Dearborn, MI (US)

(72) Inventors: Nicholas Girardi, Milford, MI (US); Scott Donald Cooper, Ann Arbor, MI (US); Cory Scott Hendrickson, Ann Arbor, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 565 days.

(21) Appl. No.: 14/526,189

(22) Filed: Oct. 28, 2014

(65) Prior Publication Data
US 2016/0115838 A1  Apr. 28, 2016

(51) Int. Cl.
*F01N 3/20* (2006.01)
*F01N 9/00* (2006.01)

(52) U.S. Cl.
CPC .............. *F01N 3/208* (2013.01); *F01N 9/00* (2013.01); *F01N 2610/02* (2013.01); *F01N 2900/10* (2013.01); *F01N 2900/1818* (2013.01); *Y02T 10/24* (2013.01); *Y02T 10/47* (2013.01)

(58) Field of Classification Search
CPC ........ F01N 3/208; F01N 9/00; F01N 2610/02; F01N 2900/10; F01N 2900/1818; Y02T 10/24; Y02T 10/47
See application file for complete search history.

(56) References Cited

U.S. PATENT DOCUMENTS

| | | |
|---|---|---|
| 8,096,112 B2 | 1/2012 | Dalton |
| 2007/0079599 A1* | 4/2007 | Osaku ................... F01N 3/2066 60/283 |
| 2007/0202019 A1 | 8/2007 | Nishina et al. |
| 2008/0089384 A1* | 4/2008 | Nishina .............. B01D 53/9431 374/54 |
| 2008/0127635 A1* | 6/2008 | Hirata ................ B01D 53/9431 60/286 |
| 2009/0031713 A1* | 2/2009 | Suzuki ............... B01D 53/9409 60/301 |
| 2009/0193793 A1* | 8/2009 | Matsunaga ............. F01N 3/106 60/287 |
| 2010/0031640 A1* | 2/2010 | Ohashi ................... B01D 53/90 60/286 |
| 2010/0200107 A1 | 8/2010 | Weathers et al. |
| 2011/0023855 A1* | 2/2011 | Van Nieuwstadt ..... F01N 3/208 123/703 |
| 2011/0107812 A1* | 5/2011 | Kasahara ............... F01N 3/2066 73/1.02 |

(Continued)

*Primary Examiner* — Hieu T Vo
*Assistant Examiner* — Arnold Castro
(74) *Attorney, Agent, or Firm* — Julia Voutyras; McCoy Russell LLP (57) ABSTRACT

A method for an exhaust system is provided, comprising adjusting reductant injection responsive to a reductant concentration, the reductant concentration based on concentration sensor readings and vehicle motion. If the reductant freezes, the reductant may stratify, leading to inaccurate concentration sensor readings. Vehicle motion may mix the reductant, thereby ensuring an accurate concentration measurement which may then be used to adjust reductant injection.

20 Claims, 5 Drawing Sheets

(56) References Cited

U.S. PATENT DOCUMENTS

| | | | |
|---|---|---|---|
| 2011/0239629 A1* | 10/2011 | Tanoura | B01D 53/90 60/276 |
| 2011/0262329 A1* | 10/2011 | Ofoli | B01D 53/90 423/213.2 |
| 2012/0118059 A1 | 5/2012 | Reimer et al. | |
| 2013/0205756 A1* | 8/2013 | Levin | F01N 3/2066 60/274 |
| 2013/0298533 A1 | 11/2013 | Kowalkowski et al. | |
| 2014/0050642 A1* | 2/2014 | Yacoub | B01D 53/9495 423/212 |
| 2014/0053537 A1* | 2/2014 | Yan | F01N 3/2066 60/286 |
| 2014/0196521 A1 | 7/2014 | Basu | |
| 2014/0260191 A1* | 9/2014 | Reynolds, III | F01N 11/00 60/274 |

* cited by examiner

SYSTEMS AND METHODS FOR MANAGING DIESEL EXHAUST FLUID STRATIFICATION

BACKGROUND AND SUMMARY

Engine exhaust systems may use various injections of a reductant to assist in the reaction of various exhaust emissions. In one example, the reductant may include Diesel Exhaust Fluid (DEF), which may include a urea-based chemical reactant used in selective catalytic reduction (SCR) to reduce emissions of oxides of nitrogen in the exhaust of diesel vehicles. DEF may be stored in a storage vessel, such as a tank, on-board a vehicle.

DEF may comprise a mixture of a reductant, such as urea, and water. The concentration of the reductant in the in the storage tank, and thus the concentration of reductant injected into the exhaust system, must be known in order to effectively reduce emissions. Government regulations require diesel vehicle to be equipped with a sensor to measure the concentration of DEF.

However, if the DEF freezes and then thaws, the fluid will stratify, creating a varied concentration in fluid within the tank. The reductant, typically heavier than water, will have a higher concentration at the bottom of the tank than the top of the tank. This may lead to inaccurate concentration sensor readings, as the sensor will measure local concentration, and the local concentration may not be equal to the bulk fluid concentration. The local concentration will depend on both the positioning of the sensor within the tank and the orientation of the tank. Until the fluid is thoroughly mixed, the concentration sensor readings will be invalid.

The inventors herein have recognized the above problems and issues and have developed methods and systems to at least partially address them. In one example, a method for an exhaust system is provided, comprising adjusting reductant injection responsive to a reductant concentration, the reductant concentration based on concentration sensor readings and vehicle motion. If the reductant freezes, the reductant may stratify, leading to inaccurate concentration sensor readings. Vehicle motion may mix the reductant, thereby ensuring an accurate concentration measurement which may then be used to adjust reductant injection.

In another example, a method for an exhaust system is provided, comprising indicating a concentration of a reductant stored in a reductant tank based on an output of a concentration sensor coupled within the reductant tank responsive to an indication that a local concentration of reductant at the concentration sensor is within a threshold of a bulk concentration of the reductant stored in the reductant tank, and adjusting a reductant injection profile based on the indicated reductant concentration. If the reductant becomes stratified, for example, following a freeze-thaw event, the local concentration at the concentration sensor may not reflect the bulk concentration. When an indication is received that the local concentration is within a threshold of the bulk concentration, accurate measurements of the reductant can be made using a single sensor. In this way, vehicle emissions may be reduced efficiently.

In yet another example, a vehicle exhaust system is provided, comprising a diesel exhaust fluid tank configured to store a diesel exhaust fluid, a diesel exhaust fluid concentration sensor coupled within the diesel exhaust fluid tank, and a controller configured with instructions stored in non-transitory memory, that when executed, cause the controller to: retrieve a recent valid diesel exhaust fluid concentration measurement, determine a likelihood of a diesel exhaust fluid freeze-thaw event occurring since the recent valid diesel exhaust fluid concentration measurement, set a mixing threshold based on the likelihood of the diesel exhaust fluid freeze-thaw event, determine a concentration sensor entry condition based on vehicle operating condition, indicate a concentration of the diesel exhaust fluid based on an output of the diesel exhaust fluid concentration sensor responsive to the concentration sensor entry condition is greater than the mixing threshold, and adjust a reductant injection profile based on the indicated reductant concentration. The concentration sensor entry condition may be based on vehicle operating conditions, such as speed and/or acceleration, indicating a relative amount of vehicle motion and thus inferring an amount of bulk fluid movement. In this way, the diesel exhaust fluid may be accurately quantified following a freeze-thaw event, allowing for an accurate amount of diesel exhaust fluid to be mixed with exhaust air, thus reducing vehicle emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
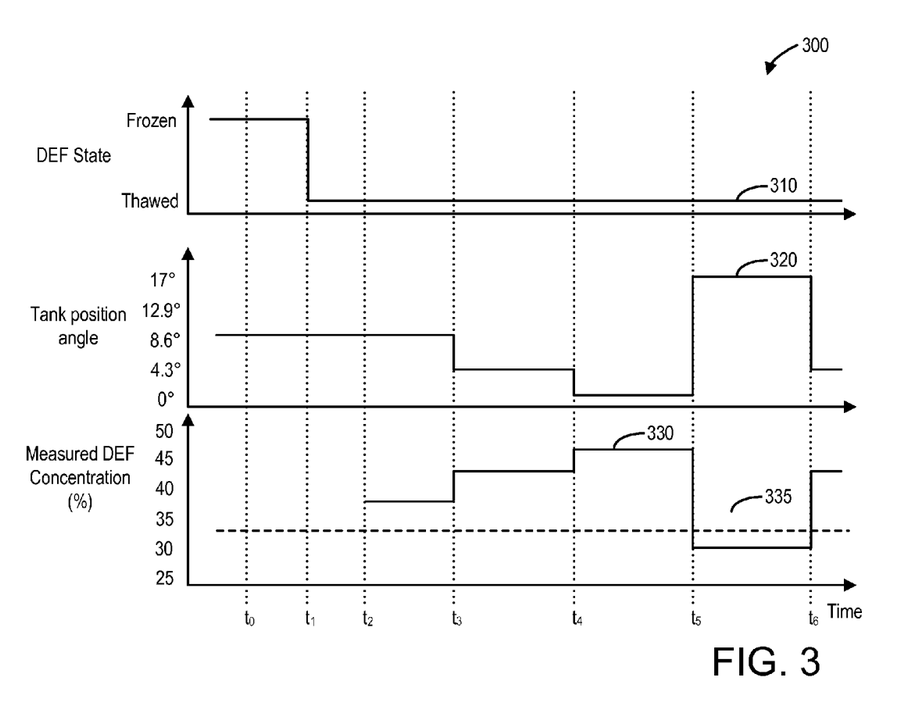
FIG. 3 shows an example timeline for distribution of diesel exhaust fluid within a diesel exhaust fluid tank over time.
Figure 4:
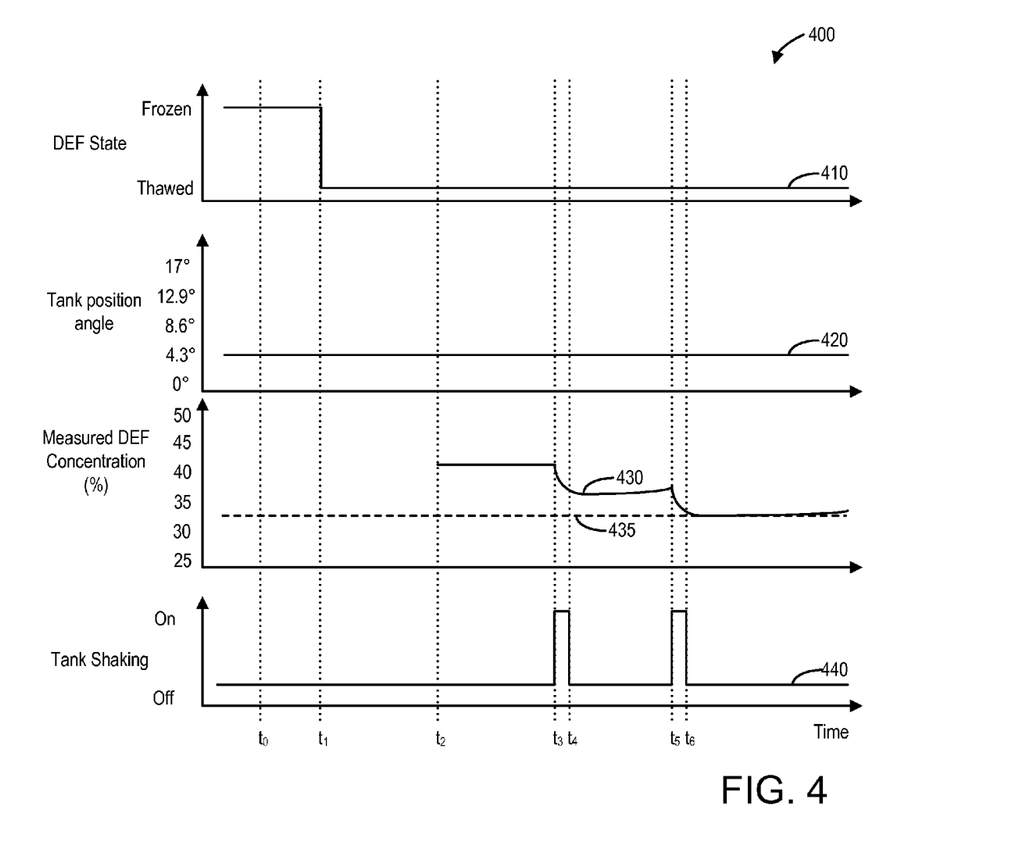
FIG. 4 shows an example timeline for mixing of diesel exhaust fluid within a diesel exhaust fluid tank over time.

This detailed description relates to systems and methods for an exhaust system. In particular, the description relates to systems and methods for determining the validity of an output of a diesel exhaust fluid concentration sensor. The exhaust system may be included in a diesel vehicle, such as the vehicle schematically shown in FIG. 1. Diesel exhaust fluid may be stored within a storage tank, such as the tank shown in FIGS. 2A and 2B. The concentration of the reductant in the diesel exhaust fluid may be measured by a dedicated sensor. If the diesel exhaust fluid goes through a freeze thaw cycle, the fluid will stratify, with higher concentration layers settling to the bottom of the tank. The concentration of the fluid as measured by the sensor is thus dependent on the location of the sensor, and the orientation of the tank, as shown in FIG. 3. Only by thoroughly mixing the fluid will the local concentration at the sensor reflect the average bulk fluid concentration, as shown in FIG. 4. In order to accurately indicate the concentration of diesel exhaust fluid, a method may be employed to determine whether the fluid is sufficiently mixed, such as the method shown in FIG. 5.

Figure 1:
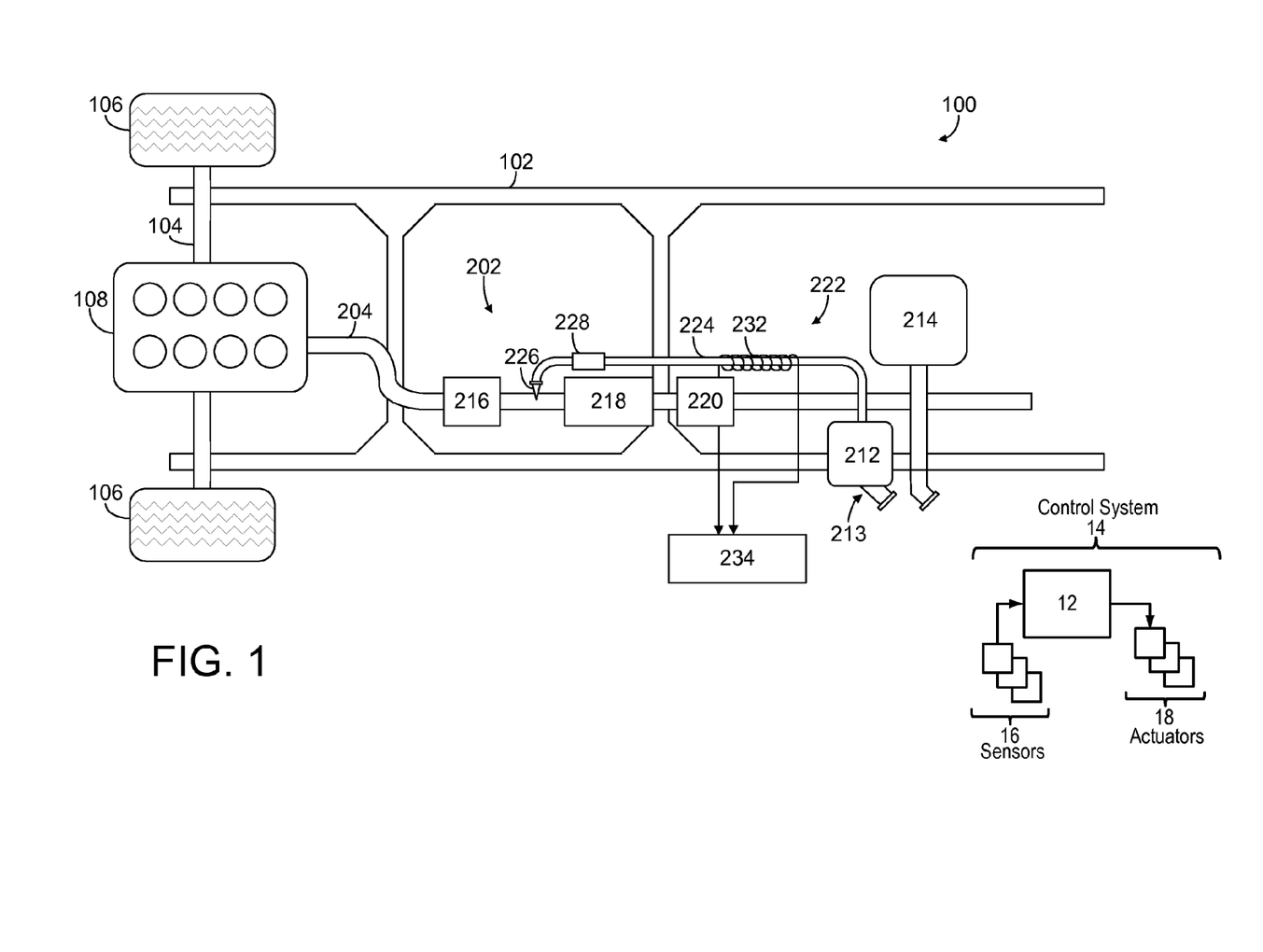
FIG. 1 shows a schematic depiction of an example vehicle system.

Turning to FIG. 1, a schematic depiction of an example vehicle system is shown generally at 100. Vehicle 100 may include a chassis 102, an axle 104 with wheels 106, an engine 108, and a control system 14. Though FIG. 1 shows one axle and set of wheels, vehicle 100 may include a plurality of axles and sets of wheels. The engine 108 may be a diesel engine in one example. Further, although not shown, vehicle 100 may further include a transmission, cab, or other components.

Control system 14 is shown receiving information from a plurality of sensors 16 (various examples of which are described herein) and sending control signals to a plurality of actuators 18 (various examples of which are described herein). As one example, sensors 16 may include exhaust gas sensors, such as NOx, O2, and various other sensors coupled in the engine exhaust. Other sensors, such as pressure and temperature sensors, may be coupled to various locations in the vehicle. As another example, the actuators may include fuel injectors (not shown), reductant injectors, reductant line heaters, and various others as described herein. The control system 14 may include a controller 12. The controller may receive input data from the various sensors, process the input data, and trigger the actuators in response to the processed input data based on instructions or code programmed or encoded therein corresponding to one or more routines. In one example, controller may be a microcomputer, including microprocessor unit, input/output ports, an electronic storage medium for executable programs and calibration values, random access memory, keep alive memory, and a data bus.

Vehicle 100 may further include an exhaust system 202. The exhaust system may include an exhaust conduit 204 leading to one or more exhaust aftertreatment devices (e.g., devices 216, 218, and 220), as well as a reductant delivery and storage system, such as DEF system 222. Portions of the exhaust system, such as conduit 204, may be coupled to an exhaust manifold of the engine to that exhaust gas is supplied from the exhaust manifold to the conduit 204.

The exhaust aftertreatment devices may be disposed in various orders and/or combinations along exhaust conduit 204. For example, a diesel oxidation catalyst (DOC) 216 may be followed downstream by a selective catalytic reduction (SCR) catalyst 218. SCR catalyst 218 may be followed downstream by a diesel particulate filter (DPF) 220. It should be understood that the emission control devices of the exhaust system 202 shown in the FIG. 1 is exemplary in nature. Various other emission control devices and configurations may be included in the exhaust system 202. For example, exhaust system 202 may include an SCR followed by a DPF only. In another example, the exhaust system 202 may only include an SCR. In still another example, a DPF may be located upstream of the SCR, or a combined DPF/SCR catalyst may be used, for example.

The exhaust system 202 may further include a reductant delivery and/or storage system, such as DEF system 222. As noted herein, the DEF may be a liquid reductant, such as a urea, stored in a storage vessel, such as a storage tank. In one example, the DEF system 222 may include DEF tank 212 for onboard DEF storage, a DEF delivery line 224 that couples the DEF tank to exhaust conduit 204 via an injector at or upstream of SCR 218. The DEF tank 212 may be of various forms, and may include a filler neck 213 and corresponding cap and/or cover door in the vehicle body. Filler neck 213 may be configured to receive a nozzle for replenishing DEF. Vehicle 100 may also include a fuel tank 214 that may be positioned proximate to the DEF tank 212.

DEF system 222 may also include a DEF injector 226 in line 224 which injects DEF into the exhaust upstream of the SCR. DEF injector 226 may be used to control the timing and amount of DEF injections, via the control system 14. DEF system 222 may further include a DEF pump 228. DEF pump 228 may be used to pressurize and deliver DEF into the line 224. DEF system 222 may further include a DEF line heater 232 which heats DEF line 224. For example, the DEF line heater may warm the DEF fluid on the way to the DEF pump at low temperatures in order to maintain a DEF fluid viscosity. The heater may be a resistive heater, or various other configurations. The heater may be coupled to a power supply 234, such as a battery system, and may be enabled and controlled via one or more switches via control system 14, for example.

Figure 2A:
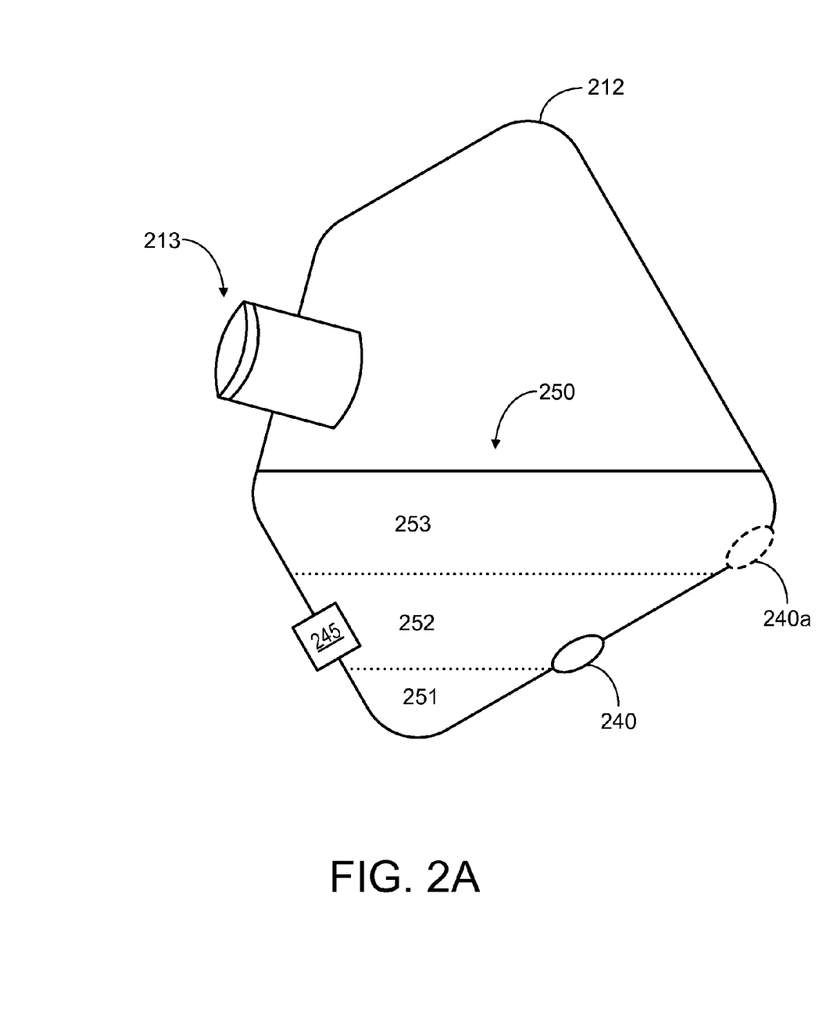
FIG. 2A shows a schematic depiction of a diesel exhaust fluid tank at a 17° tank position angle.
Figure 2B:
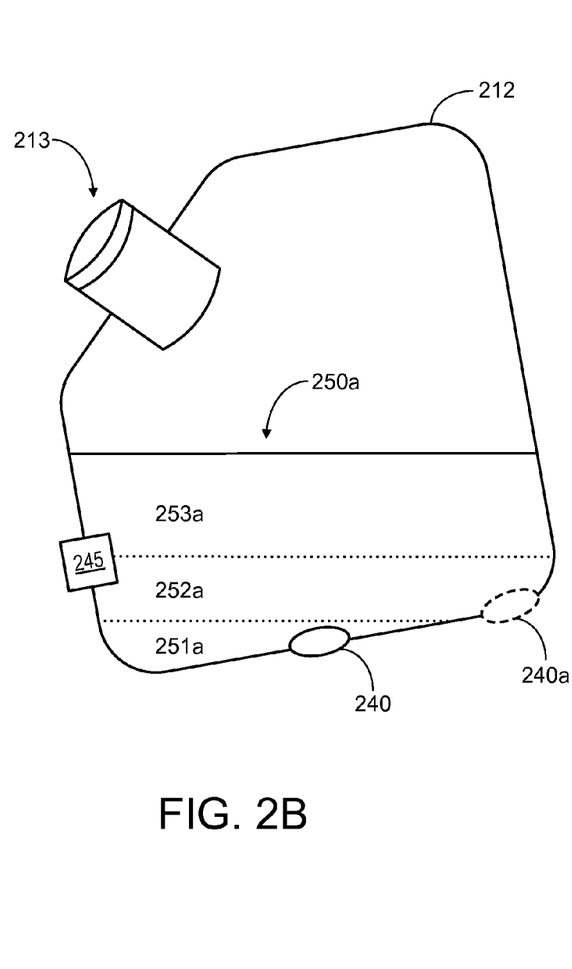
FIG. 2B shows a schematic depiction of a diesel exhaust fluid tank at a 4.3° tank position angle.

FIGS. 2A and 2B schematically show DEF tank 212, including filler neck 213. DEF tank 212 includes a urea concentration and level sensor (UCLS) 240, and a reductant temperature sensor 245. Reductant temperature sensor 245 is shown separate from UCLS 240, though in some configurations the two sensors may be co-housed. In this configuration, sensors are placed within the tank, though in some examples, one or more sensors may be coupled within an extraction unit (such as pump 228) and/or an extraction line (such as DEF delivery line 224). Concentration sensors are mandated in order to deliver urea at a concentration that is most effective to reduce exhaust components (e.g. 32.5% urea).

UCLS 240 and temperature sensor 245 may indicate properties of diesel exhaust fluid (DEF) 250 stored within DEF tank 212, as shown in FIG. 2A. However, after freezing and thawing, DEF 250 may stratify and create concentration variation within DEF tank 212. For example, DEF 250 is shown stratified into a high concentration layer 251, a moderate concentration layer 252, and a low concentration layer 253. Although these layers are illustrative, a concentration gradient developed following a freeze-thaw cycle may be continuous.

As such, the measured concentration of DEF 250 may be dependent on the position of UCLS 240. As shown in FIG. 2A, UCLS 240 is located within moderate concentration layer 252. However, UCLS 240a is located within low concentration layer 253. As such, UCLS 240 would report a different concentration than UCLS 240a. Depending on the degree of stratification of DEF 250, the output of sensors in both positions may erroneously report the actual concentration of DEF 250, as the sensor is measuring a local concentration, and not a concentration of the bulk fluid.

Further, once stratified, the measured concentration of DEF 250 may be dependent on an angle of tilt of tank 212. For example, in FIG. 2A, DEF tank 212 is positioned at a 17° tilt, whereas in FIG. 2B, tank 212 is positioned at a 4.3° tilt. In the configuration shown in FIG. 2B, DEF fluid 250a is shown stratified into a high concentration layer 251a, a moderate concentration layer 252a, and a low concentration layer 253a. Each layer contains the same amount of fluid as the respective layer in FIG. 2A, but due to the tilt of the DEF tank, the layers are distributed differently within the tank, and relative to UCLS 240 and 240a. In the configuration shown in FIG. 2B UCLS 240 is located within low concentration layer 251a, while UCLS 240a is located within moderate concentration layer 252a.

FIG. 3 shows an example timeline 300 for distribution of DEF within a DEF tank over time. Timeline 300 includes plot 310, indicating the state of DEF within the DEF tank over time. Timeline 300 further includes plot 320, indicating the tank position angle of the DEF tank over time. Timeline 300 further includes plot 330, indicating the measured DEF concentration over time. Line 335 indicates the actual bulk DEF concentration within the tank. Timeline 300 will be described with regard to the systems described herein and with regard to FIGS. 1 and 2A-2B, specifically with reference to DEF tank 212, with DEF concentration measured by UCLS 240.

At time $t_0$, the DEF is in a frozen state, with the DEF tank positioned with a tank angle of 8.6°. At time $t_1$, the DEF transitions into a thawed state, while the tank angle is maintained. At time $t_2$, DEF concentration is measured with the tank angle maintained at 8.6°. The measurement indicates that the local urea concentration of the DEF fluid at the UCLS is ~38%, greater than the actual bulk fluid concentration of ~32.5% indicated by line 335.

At time $t_3$, the tank angle is decreased to 4.3°. Accordingly, the local urea concentration of the DEF fluid at the UCLS increases, as the high concentration layer is redistributed. At time $t_4$, the tank angle is decreased to 0.7°. Accordingly, the local urea concentration of the DEF fluid at the UCLS increases even further. At time $t_5$, the tank angle is increased to 17°. Accordingly, the local urea concentration of the DEF fluid at the UCLS decreases below the bulk fluid concentration, as the UCLS is now in contact with a lower concentration layer of the DEF fluid. At time $t_6$, the tank angle the tank angle is decreased to 4.3°. Accordingly, the local urea concentration of the DEF fluid at the UCLS increases above the bulk fluid concentration, as the high concentration layer is redistributed within the tank. Although some diffusion of urea may occur following a freeze-thaw cycle, the stratification of the DEF will remain until the DEF is sufficiently mixed.

FIG. 4 shows an example timeline 400 for mixing of DEF within a DEF tank over time. Timeline 400 includes plot 410, indicating the state of DEF within the DEF tank over time. Timeline 400 further includes plot 420, indicating the tank position angle of the DEF tank over time. Timeline 400 further includes plot 430, indicating the measured DEF concentration over time. Line 435 indicates the actual bulk DEF concentration within the tank. Timeline 400 further includes plot 440, indicating whether tank shaking is occurring over time. Timeline 400 will be described with regard to the systems described herein and with regard to FIGS. 1 and 2A-2B, specifically with reference to DEF tank 212, with DEF concentration measured by UCLS 240.

At time $t_0$, the DEF is in a frozen state, as indicated by plot 410, with the DEF tank positioned with a tank angle of 4.3°, as indicated by plot 420. At time $t_1$, the DEF transitions into a thawed state, while the tank angle is maintained. At time $t_2$, DEF concentration is measured with the tank angle maintained at 4.3°. The measurement indicates that the local urea concentration of the DEF fluid at the UCLS is ~10% greater than the actual bulk fluid concentration of ~32.5% indicated by line 435.

From time $t_3$ to time $t_4$, the tank is shaken, as indicated by plot 440. The measured concentration decreases, as the DEF is mixed and some of the reductant dissolves into solution. Following time $t_4$, the measured concentration is less than the measured concentration at time $t_2$ (before the tank was shaken), indicating that some mixing of the DEF has occurred, although the measured, local concentration is still greater than the bulk fluid concentration. From time $t_4$ time $t_5$, the measured concentration of reductant increases slightly, as urea that was shaken but did not dissolve settles towards the bottom of the tank. From time $t_5$ to time $t_6$, the tank is shaken again. The measured concentration decreased, as the DEF is mixed, and more of the urea dissolves into solution. Following time $t_6$, the measured concentration is less than the measured concentration at time $t_4$, indicating that additional mixing of the DEF has occurred. The measured concentration is now similar to the actual bulk fluid concentration of ~32.5% indicated by line 335. Following time $t_6$, the measured concentration may fluctuate slightly, although the measured concentration remains within a threshold of the bulk fluid concentration.

Figure 5:
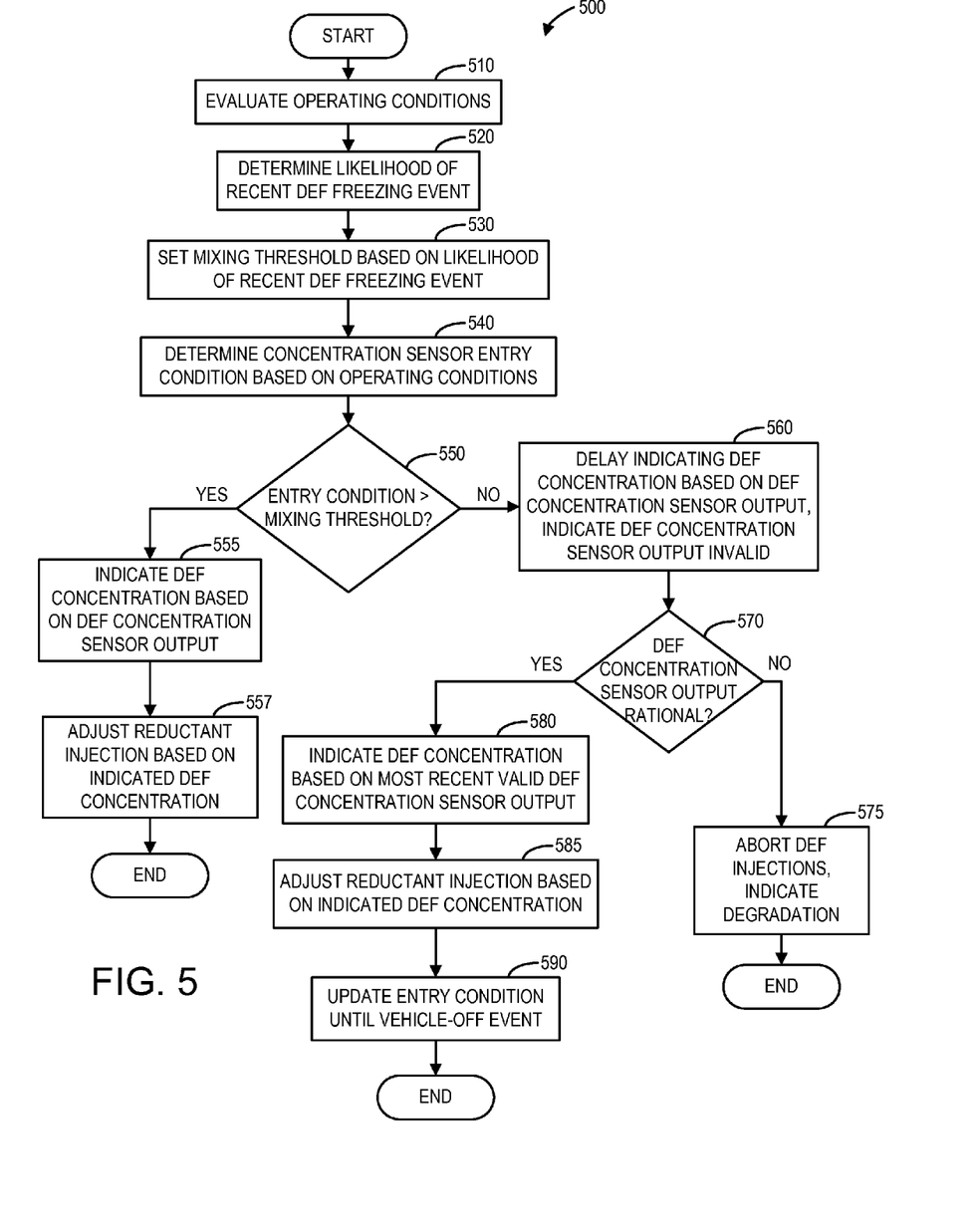
FIG. 5 shows a flow chart for an example method for determining the validity of a diesel exhaust fluid concentration sensor.

FIG. 5 shows a flow chart for an example high-level method 500 for determining the validity of a DEF concentration sensor. Method 500 will be described in reference to the systems described herein and with regard to FIGS. 1 and 2A-2B, but it should be understood that similar methods may be applied to other systems without departing from the scope of this disclosure. Method 500 may be carried out by control system 14, and may be stored at controller 12 in non-transitory memory.

Method 500 may begin at 510. At 510, method 500 may include evaluating operating conditions. Operating conditions may be measured, estimated, and/or inferred. Among other conditions, operating conditions may include vehicle conditions, such as vehicle speed, vehicle acceleration, etc.; engine conditions, such as engine speed, engine load, etc.; and ambient conditions, such as ambient temperature, barometric pressure, etc.

Continuing at 520, method 500 may include determining the likelihood of a recent DEF freezing event. Determining the likelihood of a recent DEF freezing event may include determining a time of a previous valid DEF concentration reading from an UCLS, and may further include accessing ambient temperature data and/or DEF tank temperature between the time of the previous valid DEF concentration reading and a current time. DEF tank temperature may be recorded and stored at controller 12 during time periods when the vehicle is in a vehicle-on condition. Ambient may also be recorded and stored at controller 12 during time periods when the vehicle is in a vehicle-on condition, and further, may be accessed from weather-data servers for time periods when the vehicle is in a vehicle-off condition. For example, if a vehicle-off condition has occurred in the time since the previous valid DEF concentration reading, an ambient temperature profile for the vehicle-off period may be retrieved from an off-board computing system such as a network or cloud computing system via wireless communication, which may be Wi-Fi, Bluetooth, a type of cellular service, or a wireless data transfer protocol, for example. The ambient temperature and DEF tank temperature profiles for vehicle-on periods may be retrieved from the controller. Other conditions that may affect the melting temperature of DEF fluid, such as barometric pressure, may be accessed as well. Based on the accessed temperature profiles, a likelihood of a recent DEF freezing event may be determined. The likelihood of a recent DEF freezing event may be dynamically updated throughout vehicle operation.

Continuing at 530, method 500 may include setting a mixing threshold based on the likelihood of a recent DEF freezing event. The mixing threshold may be a value indicating an amount of DEF fluid mixing needed to validate a urea concentration measurement from the UCLS. As such, the threshold may be inversely proportionate to ambient temperature and/or DEF tank temperature. In other words, a smaller mixing threshold may be set when ambient temperature is a threshold higher than the melting temperature of the DEF fluid, indicating a low likelihood of a recent freezing event, while a higher mixing threshold may be set when ambient temperature is closer to the melting temperature of the DEF fluid. The mixing threshold may be fixed following a vehicle-on event based on the likelihood and extent of stratification. If the DEF fluid undergoes an additional freeze-thaw event during the vehicle-on condition, the mixing threshold may be updated based on the updated conditions.

Continuing at 540, method 500 may include determining a concentration sensor entry condition based on operating conditions. For example, a concentration sensor entry condition may be based on vehicle speed and acceleration. In one example, a positive definite function may be calculated:

$$\int_0^T aV^2(t) + b\dot{V}^2(t) dt$$

Where a and b are constants, V is vehicle velocity, and t is time. The function may begin integrating when the DEF fluid is confirmed to be thawed to a certain fraction of the total reductant stored in the tank. This may be determined from a model of the reductant temperature (based on reductant temperature and other vehicle conditions) and/or from the time since the concentration sensor started reporting non-frozen values (reductant local to the concentration sensor is guaranteed to be liquid if it measures a speed of sound).

In some examples, the concentration sensor entry condition may be determined based on other characteristics. For example, a vehicle acceleration/deceleration profile may be determined based on output from vehicle accelerometers and/or vehicle speed data. A vehicle speed profile may be determined based on vehicle speed data. A time vs speed relationship may be determined, where the amount of time a vehicle spends at a specific speed is calculated. The absolute value of vehicle acceleration may be integrated over time. For example, vehicle acceleration may be integrated starting at a vehicle-on event, such as a key-on event, or following a DEF thawing event.

Continuing at 550, method 500 may include determining whether the concentration sensor entry condition is greater than the mixing threshold. If the concentration sensor entry condition is greater than the mixing threshold, method 500 may proceed to 555. At 555, method 500 may include indicating the DEF concentration based on the DEF concentration sensor output. Continuing at 557, method 500 may include adjusting reductant injection based on the indicated DEF concentration. Method 500 may then end.

If the concentration sensor entry condition is not greater than the mixing threshold, method 500 may proceed to 560. At 560, method 500 may include indicating that the output of the DEF concentration sensor is invalid, and may further include delaying indicating the DEF concentration based on the DEF concentration sensor output.

Continuing at 570, method 500 may include determining whether the DEF concentration sensor output is rational. For example, method 500 may include determining whether local DEF concentration, as measured by the concentration sensor is within a stratification threshold of a known bulk DEF concentration. The expected concentration change due to stratification has a limit. For example, if the maximum stratified concentration change is +/−20% for a bulk DEF concentration of 32.5%, then a measurement of 0% would fall outside the stratification. This may indicate that the DEF tank has incorrectly been filled with diesel fuel which has a significantly different concentration than DEF. Identifying diesel fluid in the DEF tank may prevent inadvertent injection of fuel into a hot exhaust conduit.

If the DEF concentration sensor output is not rational, method 500 may proceed to 575. At 575, method 500 may include aborting DEF injections in to the exhaust conduit, and may further include indicating degradation of the DEF fluid. The actions in 575 may specifically include maintaining the injection of DEF fluid into the exhaust completely off during engine operating conditions that would otherwise include injection of DEF fluid. For example, during conditions without degradation indicated, DEF fluid may be injected at a selected rate based on operating conditions, such as exhaust temperature, whereas under this same exhaust temperature where degradation has been determined and indicated, no DEF fluid is injected. Additional actions may also be taken in response to the indication of degradation, such as adjusting engine load limits, limiting maximum engine torque to a lower level than otherwise, etc. Method 500 may then end.

If the DEF concentration sensor output is rational, method 500 may proceed to 580. At 580, method 500 may include indicating the DEF concentration based on the most recent valid DEF concentration sensor output. For example, a concentration sensor output from a time point prior to the freeze-thaw event may be used, such as a time point during a previous vehicle-on condition. Continuing at 557, method 500 may include adjusting reductant injection based on the indicated DEF concentration. Reductant injection may be adjusted independently of the current DEF concentration sensor output. Continuing at 590, method 500 may include dynamically updating the concentration sensor entry condition until the next vehicle-off event. Method 500 may continuously compare the concentration sensor entry condition to the mixing threshold, as indicated at 550, until the concentration sensor entry condition is greater than the mixing threshold, indicating that the DEF concentration sensor output is valid. Method 500 may then end.

A valid DEF concentration sensor output may be utilized in determining a quantity of reductant to inject into the exhaust conduit. As such, a quantity of reductant injection may be based on a newly indicated reductant concentration. Further, the timing of reduction injections may be adjusted based on newly indicated reductant concentrations. In some examples, reductant injection may be suspended responsive to an invalid concentration sensor output. For example, if ambient or DEF temperature indicates that the DEF fluid is likely to be frozen at key-on, reductant injection may be suspended. Reductant injection may be suspended or adjusted responsive to an indication that the DEF is likely to be stratified following a freeze-thaw event. For example, the DEF pump may be configured to draw DEF fluid from a certain portion of the DEF tank. For example, if the DEF pump is configured to draw DEF fluid from the bottom of the tank, and the concentration sensor entry condition indicates that the DEF fluid is likely to be stratified, the DEF fluid at the bottom of the tank is likely to be higher in concentration than the previous valid concentration. Reductant injections may thus be reduced in volume until the concentration sensor entry condition increases above the mixing threshold. For a known reductant concentration, an algorithm or lookup table may comprise approximate reductant concentrations based on previous valid reductant concentrations, varied concentration sensor entry conditions, varied mixing thresholds, and the configuration of the DEF pump.

The systems described herein and with regard to FIGS. 1 and 2A-2B, along with the method described herein and with regard to FIG. 5 may enable one or more systems and one or more methods. In one example, a method for an exhaust system is provided, comprising adjusting reductant injection responsive to a reductant concentration, the reductant concentration based on concentration sensor readings and vehicle motion. The reductant concentration may be further based on a temperature profile during an immediately previous vehicle off condition. The temperature profile during an immediately previous vehicle off condition may be an ambient temperature profile. The temperature profile during the immediately previous vehicle off condition may be retrieved from an off-board server. The reductant concentration may be based on a vehicle acceleration profile. In some examples, the reductant concentration is based on a vehicle speed profile. The method may further comprise adjusting reductant injection based at least in part on a current concentration sensor reading responsive to an amount of vehicle motion during a current vehicle-on condition being greater than a mixing threshold. In some examples, the method may further comprise adjusting reductant injection based on a concentration sensor reading taken during a previous vehicle-on condition, and independent of a current concentration sensor reading responsive to an amount of vehicle motion during the current vehicle-on condition being less than the mixing threshold. The method may further comprise indicating the output of the reductant concentration sensor is invalid responsive to an amount of vehicle motion during the current vehicle-on condition being less than the mixing threshold. Adjusting reductant injection may include adjusting a quantity of reductant injected into an exhaust conduit. The reductant concentration may be a diesel exhaust fluid concentration. The technical result of implementing this method is an accurate quantification of reductant concentration following a freeze-thaw event. In this way, the reductant concentration may be measured only when the reductant is properly mixed, thereby allowing inaccurate concentration measurements to be discarded. Further, the quantity of reductant injected into an exhaust conduit may be adjusted based on an accurate concentration, thereby reducing emissions.

In another example, a method for an exhaust system is provided, comprising indicating a concentration of a reductant stored in a reductant tank based on an output of a concentration sensor coupled within the reductant tank responsive to an indication that a local concentration of reductant at the concentration sensor is within a threshold of a bulk concentration of the reductant stored in the reductant tank, and adjusting a reductant injection profile based on the indicated reductant concentration. The indication that a local concentration of reductant at the concentration sensor is within a threshold of a bulk concentration of the reductant stored in the reductant tank may be based on a level of mixing within the reductant tank following a reductant freeze-thaw event. The level of mixing may be based on a vehicle acceleration profile following the reductant freeze-thaw event. In some examples, the level of mixing may be based on a vehicle speed profile following the reductant freeze-thaw event. The technical result of implementing this method is that the concentration of reductant may be accurately determined with a single concentration sensor. Following a freeze-thaw event, the reductant may become stratified, and thus local concentration at the concentration sensor may not accurately reflect the bulk fluid concentration.

In yet another example, a vehicle exhaust system is provided, comprising a diesel exhaust fluid tank configured to store a diesel exhaust fluid, a diesel exhaust fluid concentration sensor coupled within the diesel exhaust fluid tank, and a controller configured with instructions stored in non-transitory memory, that when executed, cause the controller to: retrieve a recent valid diesel exhaust fluid concentration measurement, determine a likelihood of a diesel exhaust fluid freeze-thaw event occurring since the recent valid diesel exhaust fluid concentration measurement, set a mixing threshold based on the likelihood of the diesel exhaust fluid freeze-thaw event, determine a concentration sensor entry condition based on vehicle operating condition, indicate a concentration of the diesel exhaust fluid based on an output of the diesel exhaust fluid concentration sensor responsive to the concentration sensor entry condition is greater than the mixing threshold, and adjust a reductant injection profile based on the indicated reductant concentration. The likelihood of a diesel exhaust fluid freeze-thaw event occurring since the recent valid diesel exhaust fluid concentration measurement may be based on an ambient temperature. The vehicle exhaust system may further comprise a diesel exhaust fluid temperature sensor coupled within the diesel exhaust fluid tank, and wherein the likelihood of a diesel exhaust fluid freeze-thaw event occurring since the recent valid diesel exhaust fluid concentration measurement is based on a diesel exhaust fluid temperature. The vehicle operating conditions may include vehicle speed and vehicle acceleration. The controller may be configured with instructions stored in non-transitory memory, that when executed, cause the controller to delay indicating the concentration of the diesel exhaust fluid based on the output of the diesel exhaust fluid concentration sensor responsive to a concentration sensor entry condition being less than the mixing threshold. The technical result of implementing this system is a reduction in vehicle emissions. The system enables the diesel exhaust fluid to be accurately quantified following a freeze-thaw event, allowing for an accurate amount of diesel exhaust fluid to be mixed with exhaust air, thus reducing vehicle emissions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an exhaust system, comprising:
adjusting reductant injection responsive to a reductant concentration, the reductant concentration based on concentration sensor readings and vehicle motion including at least one of a vehicle acceleration profile and a vehicle speed profile.

2. A method for an exhaust system, comprising:
adjusting reductant injection responsive to a reductant concentration, the reductant concentration based on concentration sensor readings and vehicle motion and where the reductant concentration is further based on a temperature profile during an immediately previous vehicle off condition.

3. The method of claim 1, wherein the temperature profile during the immediately previous vehicle off condition is an ambient temperature profile.

4. The method of claim 3, wherein the temperature profile during the immediately previous vehicle off condition is retrieved from an off-board server.

5. The method of claim 1, wherein the reductant concentration is based on a vehicle acceleration profile.

6. The method of claim 1, wherein the reductant concentration is based on a vehicle speed profile.

7. The method of claim 1, further comprising:
adjusting reductant injection based at least in part on a current concentration sensor reading responsive to an amount of vehicle motion during a current vehicle-on condition being greater than a mixing threshold.

8. The method of claim 7, further comprising:
adjusting reductant injection based on a concentration sensor reading taken during a previous vehicle-on condition, and independent of the current concentration sensor reading responsive to the amount of vehicle motion during the current vehicle-on condition being less than the mixing threshold.

9. The method of claim 8, further comprising:
indicating an output of the reductant concentration sensor is invalid responsive to the amount of vehicle motion during the current vehicle-on condition being less than the mixing threshold.

10. The method of claim 1, wherein adjusting reductant injection includes adjusting a quantity of reductant injected into an exhaust conduit.

11. The method of claim 1, wherein the reductant concentration is a diesel exhaust fluid concentration.

12. A method for an exhaust system, comprising:
indicating a concentration of a reductant stored in a reductant tank based on an output of a concentration sensor coupled within the reductant tank responsive to an indication that a local concentration of reductant at the concentration sensor is within a threshold of a bulk concentration of the reductant stored in the reductant tank; and
adjusting a reductant injection profile based on the indicated reductant concentration.

13. The method of claim 12, where the indication that the local concentration of reductant at the concentration sensor is within the threshold of the bulk concentration of the reductant stored in the reductant tank is based on a level of mixing within the reductant tank following a reductant freeze-thaw event.

14. The method of claim 13, where the level of mixing is based on a vehicle acceleration profile following the reductant freeze-thaw event.

15. The method of claim 13, where the level of mixing is based on a vehicle speed profile following the reductant freeze-thaw event.

16. A vehicle exhaust system, comprising:
a diesel exhaust fluid tank configured to store a diesel exhaust fluid;
a diesel exhaust fluid concentration sensor coupled within the diesel exhaust fluid tank; and
a controller configured with instructions stored in non-transitory memory, that when executed, cause the controller to:
retrieve a recent valid diesel exhaust fluid concentration measurement;
determine a likelihood of a diesel exhaust fluid freeze-thaw event occurring since the recent valid diesel exhaust fluid concentration measurement;
set a mixing threshold based on the likelihood of the diesel exhaust fluid freeze-thaw event;
determine a concentration sensor entry condition based on vehicle operating conditions;
indicate a concentration of the diesel exhaust fluid based on an output of the diesel exhaust fluid concentration sensor responsive to the concentration sensor entry condition is greater than the mixing threshold; and
adjust a reductant injection profile based on the indicated diesel exhaust fluid concentration.

17. The vehicle exhaust system of claim 16, wherein the likelihood of a diesel exhaust fluid freeze-thaw event occurring since the recent valid diesel exhaust fluid concentration measurement is based on an ambient temperature.

18. The vehicle exhaust system of claim 16, further comprising:
a diesel exhaust fluid temperature sensor coupled within the diesel exhaust fluid tank, and wherein the likelihood of a diesel exhaust fluid freeze-thaw event occurring since the recent valid diesel exhaust fluid concentration measurement is based on a diesel exhaust fluid temperature.

19. The vehicle exhaust system of claim 16, wherein the vehicle operating conditions include vehicle speed and vehicle acceleration.

20. The vehicle exhaust system of claim 16, where the controller is configured with instructions stored in non-transitory memory, that when executed, cause the controller to:

delay indicating the concentration of the diesel exhaust fluid based on the output of the diesel exhaust fluid concentration sensor responsive to a concentration sensor entry condition being less than the mixing threshold.

* * * * *